(12) United States Patent
Park et al.

(10) Patent No.: US 7,852,533 B2
(45) Date of Patent: Dec. 14, 2010

(54) METHOD AND APPARATUS FOR ADJUSTING COLOR OF IMAGE

(75) Inventors: Dusik Park, Gyeonggi-do (KR); Changyeong Kim, Gyeonggi-do (KR); Youngsik Huh, Seoul (KR); Hoyoung Lee, Gyeonggi-do (KR); Hyunwook Ok, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 976 days.

(21) Appl. No.: 10/931,255

(22) Filed: Sep. 1, 2004

(65) Prior Publication Data
US 2005/0089220 A1     Apr. 28, 2005

(30) Foreign Application Priority Data
Sep. 1, 2003     (KR) .................... 10-2003-0060936

(51) Int. Cl.
| | |
|---|---|
| G06F 15/00 | (2006.01) |
| G06K 1/00 | (2006.01) |
| G06K 9/00 | (2006.01) |
| G03F 3/08 | (2006.01) |
| H04N 1/40 | (2006.01) |

(52) U.S. Cl. .................. 358/523; 358/1.9; 358/2.1; 358/3.23; 358/518; 382/167

(58) Field of Classification Search .................. 358/1.6, 358/1.9, 2.1, 3.07, 3.04, 3.23, 3.24, 515, 358/518, 519, 520, 538; 382/167
See application file for complete search history.

(56) References Cited

U.S. PATENT DOCUMENTS

| | | | | |
|---|---|---|---|---|
| 5,130,789 A | * | 7/1992 | Dobbs et al. ................. | 358/500 |
| 5,202,935 A | * | 4/1993 | Kanamori et al. ........... | 358/500 |
| 5,317,648 A | * | 5/1994 | Sawada et al. .............. | 382/162 |
| 5,416,890 A | * | 5/1995 | Beretta ....................... | 345/590 |
| 5,510,910 A | * | 4/1996 | Bockman et al. ............ | 358/502 |
| 5,515,172 A | * | 5/1996 | Shiau .......................... | 358/520 |
| 5,524,069 A | * | 6/1996 | Inoue .......................... | 382/270 |
| 5,751,845 A | * | 5/1998 | Dorff et al. .................. | 382/162 |
| 5,909,291 A | * | 6/1999 | Myers et al. ................. | 358/523 |
| 5,930,009 A | | 7/1999 | Sato | |

(Continued)

FOREIGN PATENT DOCUMENTS

JP     08-315132     11/1996

(Continued)

OTHER PUBLICATIONS

European Search Report issued Feb. 15, 2008 in corresponding European Patent Application No. 04255189.5-2202.

(Continued)

*Primary Examiner*—Twyler L Haskins
*Assistant Examiner*—Jonathan R Beckley
(74) *Attorney, Agent, or Firm*—Staas & Halsey LLP

(57) ABSTRACT

A method and apparatus for adjusting a color of an image, the apparatus includes a unit setting at least one adjustment region shaped as an ellipse in a color space; and a unit converting colors of pixels included in the adjustment region to other colors based on a variable set.

30 Claims, 6 Drawing Sheets

U.S. PATENT DOCUMENTS

| | | | | |
|---|---|---|---|---|
| 5,963,201 A * | 10/1999 | McGreggor et al. | .......... | 715/722 |
| 6,028,646 A * | 2/2000 | Jeong et al. | ................. | 358/520 |
| 6,058,207 A * | 5/2000 | Tuijn et al. | ................. | 382/162 |
| 6,108,441 A * | 8/2000 | Hiratsuka et al. | ........... | 382/167 |
| 6,122,012 A * | 9/2000 | Segman | ...................... | 358/518 |
| 6,124,945 A * | 9/2000 | Ishihara et al. | ............... | 358/1.9 |
| 6,204,858 B1 * | 3/2001 | Gupta | ........................ | 345/600 |
| 6,314,203 B1 * | 11/2001 | Mikuni | ...................... | 382/167 |
| 6,400,853 B1 * | 6/2002 | Shiiyama | ................... | 358/403 |
| 6,441,869 B1 * | 8/2002 | Edmunds | ................... | 358/518 |
| 6,476,793 B1 | 11/2002 | Motoyama et al. | | |
| 6,477,271 B1 * | 11/2002 | Cooper et al. | ............... | 382/167 |
| 6,518,974 B2 * | 2/2003 | Taylor et al. | ................. | 345/582 |
| 6,571,012 B1 * | 5/2003 | Pettigrew | .................... | 382/167 |
| 6,657,746 B1 * | 12/2003 | Fuchigami et al. | ........... | 358/1.9 |
| 6,690,822 B1 * | 2/2004 | Chen et al. | .................. | 382/162 |
| 6,831,755 B1 * | 12/2004 | Narushima et al. | ........... | 358/1.9 |
| 6,850,236 B2 * | 2/2005 | Deering | ...................... | 345/428 |
| 6,850,342 B2 * | 2/2005 | Woolfe et al. | ................. | 358/1.9 |
| 6,956,576 B1 * | 10/2005 | Deering et al. | ............... | 345/475 |
| 6,956,967 B2 * | 10/2005 | Gindele et al. | ............... | 382/167 |
| 7,200,263 B2 * | 4/2007 | Curry et al. | .................. | 382/154 |
| 7,379,204 B2 * | 5/2008 | Fukao | ......................... | 358/1.9 |
| 2002/0126302 A1 * | 9/2002 | Fukao | ......................... | 358/1.9 |
| 2003/0016866 A1 * | 1/2003 | Cooper et al. | ............... | 382/167 |
| 2003/0086104 A1 * | 5/2003 | Chen | .......................... | 358/1.9 |

FOREIGN PATENT DOCUMENTS

| | | |
|---|---|---|
| JP | 10-326340 | 12/1998 |
| JP | 2002-223366 | 8/2002 |
| WO | 01/78372 | 10/2001 |

OTHER PUBLICATIONS

Chinese Patent Office Action, mailed Jul. 4, 2008 and issued in corresponding Chinese Patent Application No. 2004100882605.

Japanese Office Action for corresponding Japanese application 2004-254331; dated Jul. 28, 2009.

* cited by examiner

METHOD AND APPARATUS FOR ADJUSTING COLOR OF IMAGE

CROSS-REFERENCE TO RELATED APPLICATION

This application claims the benefit of Korean Patent Application No. 2003-60936, filed on Sep. 1, 2003, in the Korean Intellectual Property Office, the disclosure of which is incorporated herein by reference.

BACKGROUND OF THE INVENTION

1. Field of the Invention

The present invention relates to a method and apparatus for adjusting a color of a moving image or a still image, and more particularly, to a method and apparatus for selectively converting a specific color of an image to another color.

2. Description of the Related Art

A method for color conversion or color adjustment of an image includes dividing an image signal into hue, brightness, chroma, and saturation signals and one-dimensionally processing the signals. The method has been disclosed in U.S. Pat. No. 5,202,935, U.S. Pat. No. 5,515,172, U.S. Pat. No. 5,930,009, U.S. Pat. No. 6,122,012, and U.S. Pat. No. 6,476,793. The method is inexpensive since a color conversion process is relatively simple. However, in this method, the degree of freedom of selecting a color region is reduced. Typically, an H-S plane is represented in polar coordinates where H is indicated by an angle and S is indicated by a distance from an origin, and a region on a color space selected by one-dimensionally combining these two coordinates becomes a sector. However, it is difficult to select a color indicating a specific object, for example, a blue sky color, a skin color, or a green grass color, because this color is correlated with a memory color, and the memory color is represented in general as an ellipse, not a sector in the H-S plane.

Referring to U.S. Pat. No. 5,202,935, discontinuity of a color space is generated as a conversion result, a converted image may become unnatural since an entire space has not been used, and color discontinuity may be generated between adjacent pixels in an image space. Referring to U.S. Pat. No. 5,930,009, color conversion can be selectively controlled for each of the R, G and B channels. However, color adjustment cannot be performed for each specific region on a color space or an image space. Referring to U.S. Pat. No. 6,122,012, since the number of controllable colors is limited to 6, other colors cannot be converted. Referring to U.S. Pat. No. 5,515,172 and U.S. Pat. No. 6,476,793, after matching an original hue value to a target hue value, a chroma value and a brightness value are properly converted. Since the original hue is matched to the target hue, colors in a specific region centering around the original hue are moved to colors in a specific region centering around the target hue. A result of the movement causes discontinuity of a color space. Accordingly, a converted image becomes unnatural.

Another method for color conversion or color adjustment of an image includes selectively performing color adjustment for each of the image components. The method has been disclosed in U.S. Pat. No. 6,262,812. In this method, division of the image components, e.g., division of a bitmap, a text and a graphic, must be performed in advance. Even if division of the image components has been performed, selective color adjustment for a specific color included in the bitmap cannot be performed.

Another method for color conversion or color adjustment of an image includes selectively performing color adjustment for each of the conversion regions. The method has been disclosed in U.S. Pat. No. 5,876,286. According to this method, a 2-D color space is divided into combinations of small triangles, and each triangle is set to a basic unit of a conversion region. In this method, by sending all colors of a region of the non-converted triangle to a region of the converted triangle, conversion from a triangle to another triangle is performed. Therefore, when the conversion is completed, the color space region of the non-converted triangle is empty. Accordingly, since discontinuity of a color space is generated, a converted image becomes unnatural.

SUMMARY OF THE INVENTION

According to an aspect of the present invention, there is provided a method of setting an adjustment region on a color space by which discontinuity of a color space is not generated in an image for which color adjustment is performed.

According to an aspect of the present invention there is also provided a method and apparatus for performing color adjustment by changing a reference color and a target color into which the reference color has to be adjusted in an adjustment region defined as an ellipse on a color space.

According to an aspect of the present invention, there is provided a method of setting an adjustment region on a color space, including: setting a coordinate point of a reference color as a centroid point of an ellipse in the color space; forming the ellipse including a coordinate point of a target color into which the reference color has to be converted; and setting the ellipse as the adjustment region.

According to another aspect of the present invention, there is provided a method of adjusting colors of an image, including setting at least one adjustment region shaped as an ellipse in a color space; and converting colors of pixels included in the adjustment region to other colors based on a variable set.

According to another aspect of the present invention, there is provided an apparatus for adjusting colors of an image, including: an adjustment unit adjusting at least one adjustment region shaped as an ellipse in a color space; and a converter unit converting colors of pixels included in the adjustment region to other colors based on a variable set.

According to another aspect of the present invention, there is provided a computer readable medium having recorded thereon a computer readable program performing the method of setting an adjustment region on a color space.

According to another aspect of the present invention, there is provided a computer readable medium having recorded thereon a computer readable program performing the method of adjusting colors of an image.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
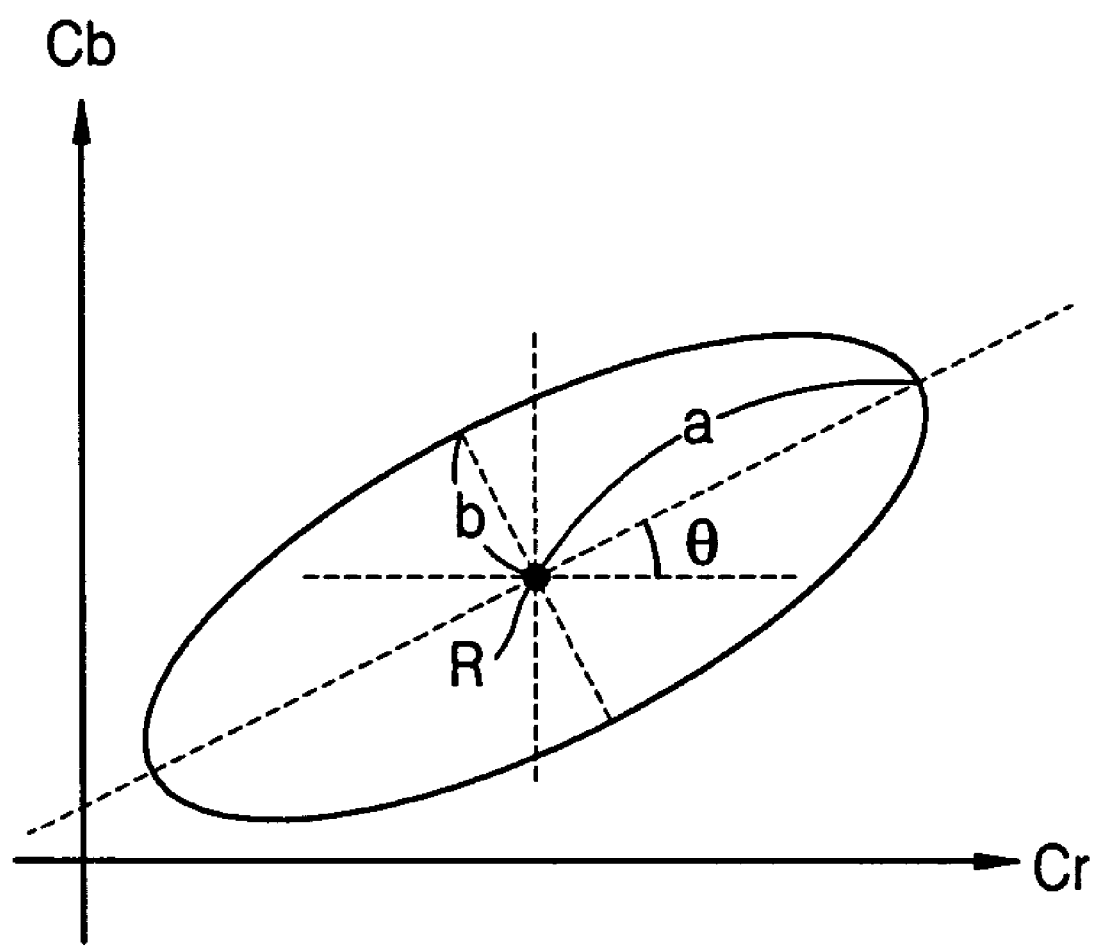
FIG. 1 is a graph illustrating a method of setting an adjustment region on a color space according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a graph illustrating a method of setting an adjustment region on a color space or image space according to an embodiment of the present invention. When RGB data of an input pixel is converted into a YCbCr color model, an X-axis indicates a first color difference signal Cb, and a Y-axis indicates a second color difference signal Cr. Besides, the RGB data of the input pixel can be converted into a plurality of color models including of a brightness signal or a chromaticity signal.

Referring to FIG. 1, the adjustment region has the form of an ellipse. A reference color R has coordinates $(x_r, y_r)$ corresponding to the centroid of the ellipse, and a target color R', into which the reference color R has to be converted, has coordinates $(x_r', y_r')$. The ellipse is characterized by a length a of a long-axis, i.e., a reference-axis, a length b of a short-axis, i.e., a complementary-axis, and a rotation angle $\theta$ between the reference-axis and the X-axis. Variables used for color adjustment include the coordinates $(x_r, y_r)$ of the reference color R, the coordinates $(x_r', y_r')$ of the target color R', first and second variables $m_1$ and $m_2$ related to the rotation angle $\theta$ of the ellipse, and third and fourth variables f and g related to the lengths of the long-axis and the short-axis of the ellipse. The first and second variables $m_1$ and $m_2$ and third and fourth variables f and g can be represented as shown in Equations 1 and 2.

$$m_1 = \cos(-\theta)$$

$$m_2 = \sin(-\theta) \qquad \text{[Equation 1]}$$

$$f = \frac{1}{a^2}$$

$$g = \frac{1}{b^2} \qquad \text{[Equation 2]}$$

Figure 2:
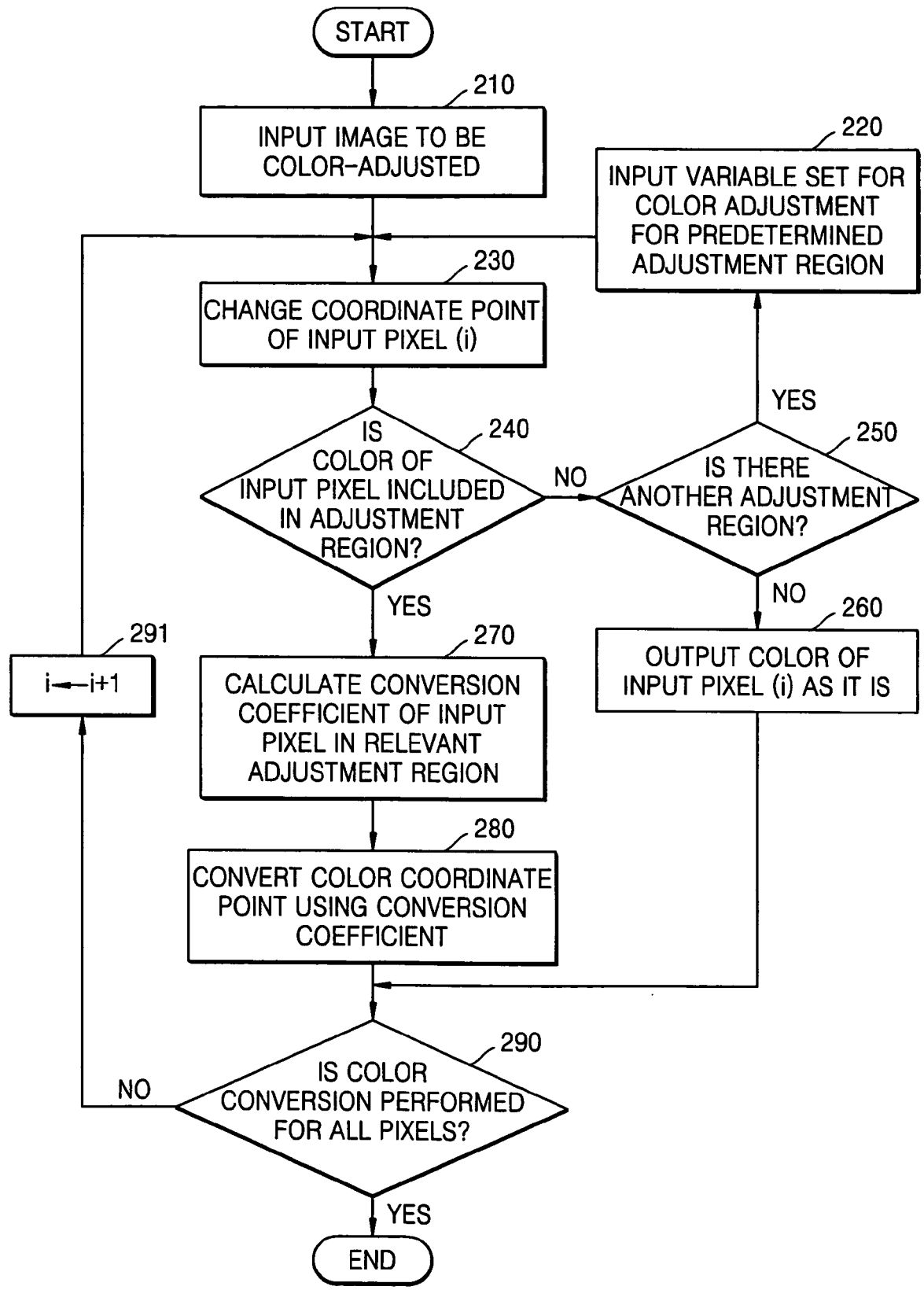
FIG. 2 is a flowchart illustrating a method of adjusting a color of an image according to an embodiment of the present invention.

FIG. 2 is a flowchart illustrating a method of adjusting a color of an image according to an embodiment of the present invention.

Referring to FIG. 2, an image signal to be color-adjusted is input in operation 210. The image signal is sequentially input in pixel units, and it is assumed that every input pixel is divided into a brightness signal, a first color difference signal and a second color difference signal such as the YCbCr color model in advance. Here, after Y is removed from a YCbCr signal into which an input pixel is converted, the input pixel is represented by a color coordinate point P(x, y) in a two-dimensional coordinate system defined by a Cr-axis and a Cb-axis as shown in FIG. 1.

A variable set for adjusting a color in the predetermined adjustment region defined by the first and second variables $m_1$ and $m_2$ and the third and fourth variables f and g calculated from the adjustment region information a, b, and $\theta$ provided by a user, the coordinates $(x_r, y_r)$ of the reference color R, and the coordinates $(x_r', y_r')$ of the target color R' are input in operation 220.

Then, the color coordinate point P(x, y) of a current pixel (i) is changed into a point P $(pl_x, pl_y)$ as shown in Equation 3 in operation 230.

$$\begin{bmatrix} pl_x \\ pl_y \end{bmatrix} = \begin{pmatrix} m_1 & -m_2 \\ m_2 & m_1 \end{pmatrix} \begin{pmatrix} x - x_r \\ y - y_r \end{pmatrix} = \begin{pmatrix} m_1(x - x_r) - m_2(y - y_r) \\ m_2(x - x_r) + m_1(y - y_r) \end{pmatrix} \qquad \text{[Equation 3]}$$

Figure 3A:
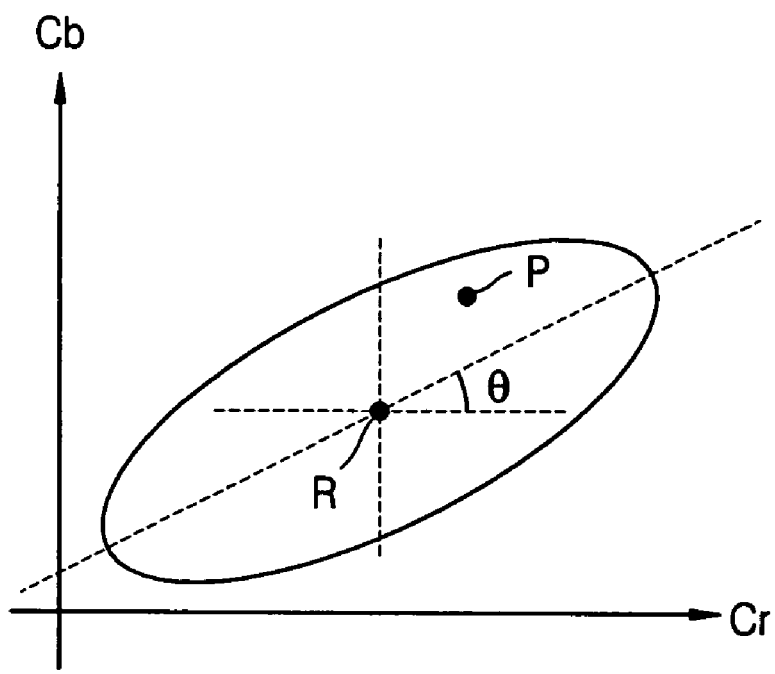
FIGS. 3A and 3B are graphs schematizing an operation of changing a coordinate point of an input pixel illustrated in FIG. 2.
Figure 3B:
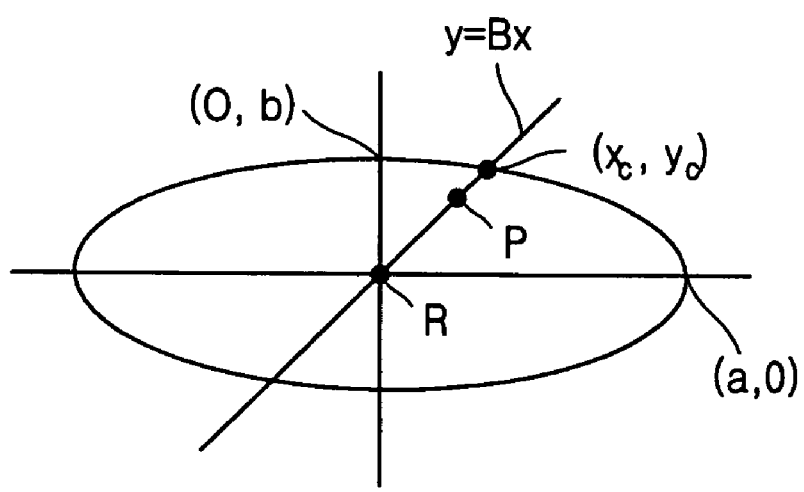

FIGS. 3A and 3B respectively show the color coordinate point P(x, y) before and after the change.

Thereafter, it is determined whether the color coordinate point $P(pl_x, pl_y)$ of the current pixel is included in the adjustment region in operation 240 using Equation 4.

$$f \times pl_x^2 + g \times pl_y^2 \leq 1 \qquad \text{[Equation 4]}$$

That is, if the color coordinate point $P(pl_x, pl_y)$ of the current pixel satisfies Equation 4, the current pixel exists in the adjustment region. Otherwise, the current pixel does not exist in the adjustment region. If the current pixel does not exist in the adjustment region, it is determined whether there is another adjustment region set by the user in operation 250. If there is another adjustment region set by the user, operations 220 through 240 are repeated. Operations 220 through 250 are performed for every adjustment region.

If the current pixel does not exist in the adjustment region and there is not another adjustment region set by the user in operation 250, the color of the current pixel (i) is output as is in operation 260.

If the changed color coordinate point of the current pixel is included in the adjustment region in operation 240, a conversion coefficient $\alpha$ of the current pixel is calculated in operation 270. To do this, as shown in FIG. 3B, a straight line connecting the color coordinate point P $(pl_x, pl_y)$ of the current pixel in the adjustment region and the centroid point of the ellipse is designated as y=Bx, the slope B is calculated as shown in Equation 5, and a distance r between the coordinates $(x_r, y_r)$ of the reference color R and an outline boundary of the adjustment region on a line passing through the color coordinate point P(x, y) of the current pixel are calculated. Coordinates $(x_c, y_c)$ define an intersection point between the straight line and the outline boundary of the adjustment region. When $pl_x^2=0$, the distance r is calculated as r=1/g, and when $pl_y^2=0$, the distance r is calculated as r=1/f. Otherwise, the distance r is calculated as shown in Equation 6.

$$B = \frac{pl_y}{pl_x} \qquad \text{[Equation 5]}$$

$$r = \sqrt{x_c^2 + y_c^2} = \sqrt{\frac{1 + B^2}{f + gB^2}} \qquad \text{[Equation 6]}$$

The conversion coefficient α of the current pixel P(x, y) can be calculated as shown in Equation 7.

$$\alpha = \frac{r - \|P - R\|}{r} = \frac{r - \sqrt{(x - x_r)^2 + (y - y_r)^2}}{r} \quad \text{[Equation 7]}$$

A newly adjusted color coordinate point P'(x', y') is obtained from the color coordinate point P(x, y) of the current pixel using the conversion coefficient α in operation 280. Here, when $(x-x_r)=(y-y_r)=0$, that is, when the color coordinate point P(x, y) of the current pixel matches the reference color coordinate point $R(x_r, y_r)$, the adjusted color coordinate point P'(x', y') is set to the target color coordinate point $R'(x_r', y_r')$. Otherwise, the adjusted color coordinate point P'(x', y') is calculated as shown in Equation 8.

$$\begin{bmatrix} x' \\ y' \end{bmatrix} = \begin{bmatrix} x \\ y \end{bmatrix} + \alpha \begin{bmatrix} x_r' - x_r \\ y_r' - y_r \end{bmatrix} \quad \text{[Equation 8]}$$

Figure 4:
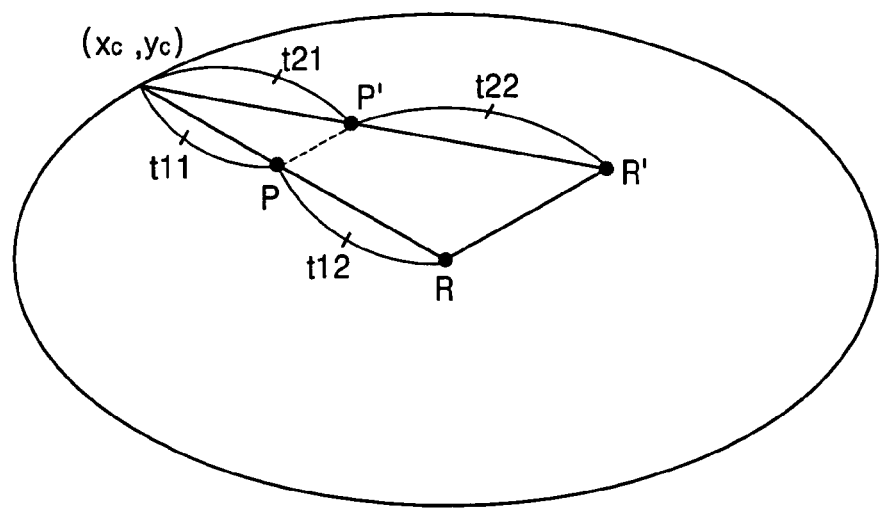
FIG. 4 is a graph schematizing an operation of converting a color coordinate point of an input pixel using a conversion coefficient illustrated in FIG. 2.

Operation 280 can be schematized as shown in FIG. 4. That is, in a triangle defined by the reference color coordinate point $R(x_r, y_r)$, the target color coordinate point $R'(x_r', y_r')$, and coordinates $(x_c, y_c)$ of the intersection between the straight line connecting the reference color coordinate $R(x_r, y_r)$ point and a color coordinate (x, y) point of the current pixel and the outline boundary, the color coordinate point P(x, y) of the current pixel is converted into a color coordinate point P'(x', y') using Equation t11:t21=t12:t22.

It is determined whether color adjustment has been performed for all pixels of the input image in operation 290. If the color adjustment has been performed for all pixels of the input image, the process is finished. Otherwise, a next pixel is designated in operation 291, and the process returns to operation 230.

Figure 5:
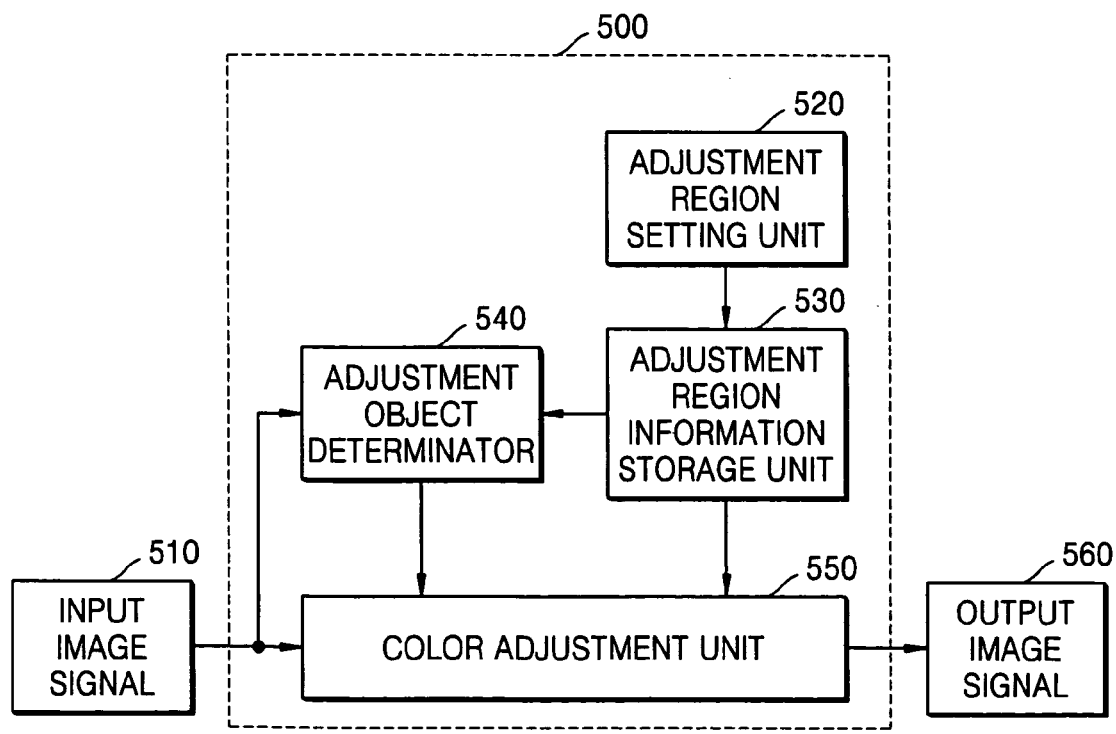
FIG. 5 is a block diagram of an apparatus adjusting a color of an image according to an embodiment of the present invention.

FIG. 5 is a block diagram of an apparatus for adjusting a color of an image according to an embodiment of the present invention. Referring to FIG. 5, the apparatus 500 includes an adjustment region setting unit 520, an adjustment region information storage unit 530, an adjustment object determinator 540, and a color adjustment unit 550.

The adjustment region information setting unit 520 sets an adjustment region based on information of adjustment regions which a user desires to adjust, input by the user via a predetermined user interface. Here, the adjustment regions can be set to more than one, and the adjustment regions can also overlap one another. The user can adjust a centroid coordinate point of an ellipse, i.e., a reference color coordinate point, a target color coordinate point, a length a of a long-axis, a length b of a short-axis, and a rotation angle θ between a long-axis of the ellipse and the X-axis in the adjustment region setting unit 520. Besides the reference color coordinate point and the target color coordinate point input according to the adjustment of the user, the first and second variables $m_1$ and $m_2$ and third and fourth variables f and g changed according to the length a of the long-axis, the length b of the short-axis, and the rotation angle θ are calculated as shown in Equation 1 and Equation 2.

The adjustment region information storage unit 530 stores a variable set for color adjustment including the first and second variables $m_1$ and $m_2$ and third and fourth variables f and g calculated by the information of the adjustment regions input from the adjustment region setting unit 520, the reference color coordinate point, and the target color coordinate point for each adjustment region in a lookup table as shown in Table 1. At this time, the adjustment regions can overlap one another. Accordingly, one pixel can be included in more than one adjustment region. In this case, the adjustment region information storage unit 530 can be designed to grant priorities for the adjustment regions, perform color adjustment of an adjustment region corresponding to a highest priority, ignore the other adjustment regions, and process a subsequent pixel. Or, the adjustment region information storage unit 530 can be designed to obtain a converted color coordinate point by performing color adjustment of all adjustment regions in which a current pixel is included and perform a vector sum operation by multiplying the converted color coordinate point by weights allocated to the adjustment regions.

The priority may be arbitrarily allocated to each adjustment region by manufacturers or users of color image processing devices. For example, a highest priority may be allocated to a skin color, and then the priority may be allocated to the adjustment region in an order of a blue sky color, a green grass color, etc. With regard to the weights, a basic weight may be allocated to each adjustment region or a weight determined by a more complicated manner may be allocated to each adjustment region. Commonly, the basic weight is calculated by (1/the number of adjustment regions to which the current pixel belongs). According to the more complicated manner, manufacturers or users of color image processing devices set importance-based weights on the adjustment regions in advance. The normalized importance-based weight is defined by (an important-based weight of a relevant adjustment region/the sum of each important-based weight of adjustment regions to which the current pixel belongs). The final weight of each adjustment region is calculated by (the basic weight×the normalized importance-based weight). That is, a conversion coefficient is calculated and the calculated conversion coefficient is multiplied by the basic weight or the final weight in each adjustment region among all of adjustment regions to which the current pixel belongs and finally the sum of the multiplication results is determined as the final conversion coefficient of the current pixel. However, methods of allocating the priorities and weights are not limited to the above embodiments and various methods may be employed considering usage environments and purposes of color image processing devices, such as digital color TVs and digital still cameras.

N adjustment regions can be represented as shown in Table 1.

TABLE 1

| adjustment region | $m_1$ | $m_2$ | f | g | $x_r$ | $y_r$ | $x_r'$ | $y_r'$ |
|---|---|---|---|---|---|---|---|---|
| 1 | $m_1(1)$ | $m_2(1)$ | f(1) | g(1) | $x_r(1)$ | $y_r(1)$ | $x_r'(1)$ | $y_r'(1)$ |
| 2 | $m_1(2)$ | $m_2(2)$ | f(2) | g(2) | $x_r(2)$ | $y_r(2)$ | $x_r'(2)$ | $y_r'(2)$ |
| 3 | $m_1(3)$ | $m_2(3)$ | f(3) | g(3) | $x_r(3)$ | $y_r(3)$ | $x_r'(3)$ | $y_r'(3)$ |
| 4 | $m_1(4)$ | $m_2(4)$ | f(4) | g(4) | $x_r(4)$ | $y_r(4)$ | $x_r'(4)$ | $y_r'(4)$ |
| . | . | . | . | . | . | . | . | . |
| . | . | . | . | . | . | . | . | . |
| . | . | . | . | . | . | . | . | . |
| N | $m_1(N)$ | $m_2(N)$ | f(N) | g(N) | $x_r(N)$ | $y_r(N)$ | $x_r'(N)$ | $y_r'(N)$ |

The adjustment object determinator 540 determines whether a current pixel of an input image signal 510 is a pixel to be adjusted by judging whether the current pixel is included in the adjustment region based on a variable set of each of the adjustment regions. If the current pixel of the input image signal 510 is a pixel to be adjusted, the adjustment object determinator 540 provides a color coordinate point of the current pixel to the color adjustment unit 550.

The color adjustment unit 550 performs the color adjustment by inputting the color coordinate point of the current pixel and a variable set of relevant adjustment region if it is determined by the adjustment object determinator 540 that the current pixel is a pixel to be adjusted since the current pixel is included in the adjustment region.

Figure 6:
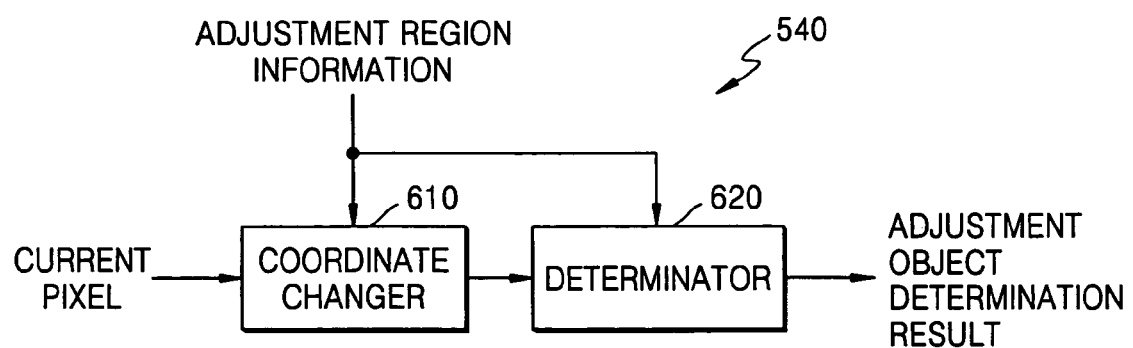
FIG. 6 is a detailed block diagram of an adjustment object determinator shown in FIG. 5.

FIG. 6 is a detailed block diagram of the adjustment object determinator 540 shown in FIG. 5. Referring to FIG. 6, the adjustment object determinator 540 includes a coordinate changer 610 and a determinator 620.

The coordinate changer 610 changes an input color coordinate point P(x, y) of a current pixel into P($pl_x$, $pl_y$) using Equation 3. The color coordinate point of the current pixel is changed for each adjustment region.

The determinator 620 receives the coordinate point P($pl_x$, $pl_y$) of the current pixel changed by the coordinate changer 610 and a variable set of each of the adjustment regions provided by the adjustment region information storage unit 530 and determines whether the changed coordinate point P($pl_x$, $pl_y$) of the current pixel is included in the respective adjustment regions using Equation 4. If the changed coordinate point P($pl_x$, $pl_y$) of the current pixel is included in an adjustment region by satisfying Equation 4, the determinator 620 provides a color coordinate point P(x, y) of the current pixel and a variable set of the adjustment region to the color adjustment unit 550. If the changed coordinate point P($pl_x$, $pl_y$) of the current pixel is not included in any adjustment regions by not satisfying Equation 4, the determinator 620 does not provide the color coordinate point P(x, y) of the current pixel to the color adjustment unit 550.

Figure 7:
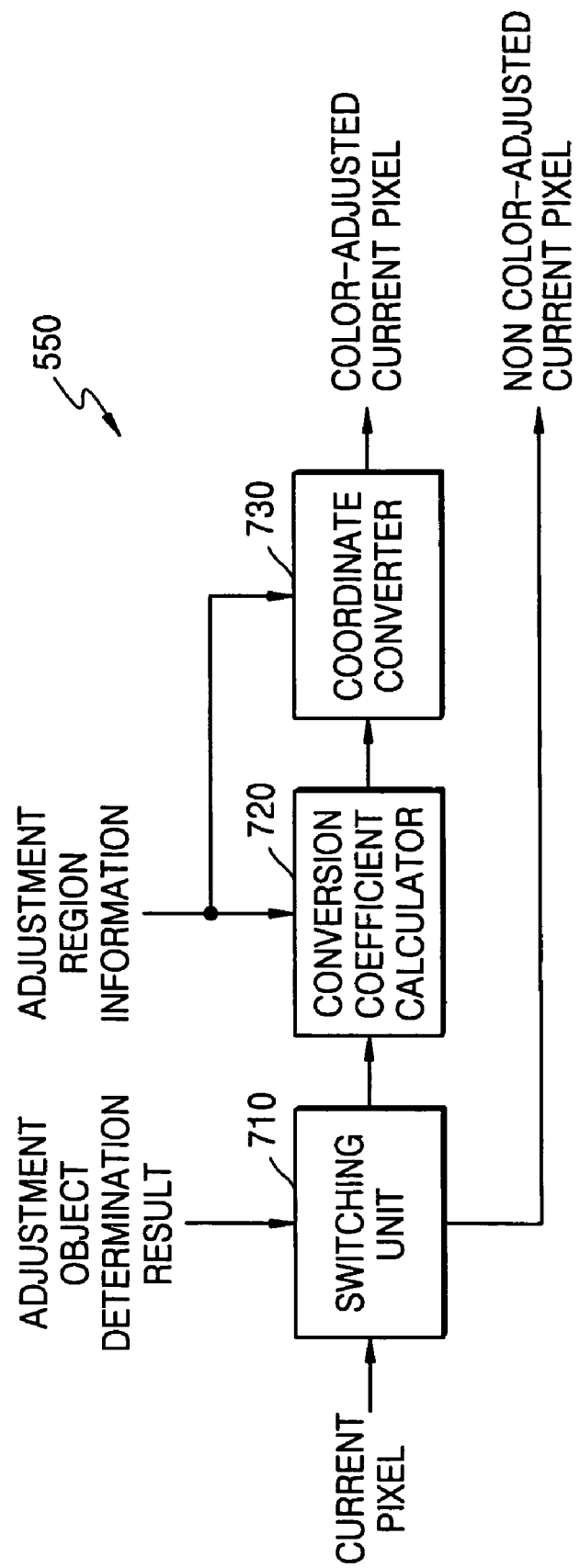
FIG. 7 is a detailed block diagram of a color adjustment unit shown in FIG. 5.

FIG. 7 is a detailed block diagram of the color adjustment unit 550 shown in FIG. 5. Referring to FIG. 7, the color adjustment unit 550 includes a switching unit 710, a conversion coefficient calculator 720, and a coordinate converter 730.

The switching unit 710 receives an adjustment object determination result of the adjustment object determinator 540 and provides a current pixel to the conversion coefficient calculator 720 or outputs the current pixel as is. That is, the switching unit 710 allows the current pixel to be color-adjusted by providing the current pixel to the conversion coefficient calculator 720 when it is determined that the current pixel is a pixel to be adjusted. The switching unit 710 prevents the current pixel from being color-adjusted by outputting the current pixel, as is when it is determined that the current pixel is not a pixel to be adjusted.

If an input pixel is provided from the switching unit 710, the current pixel is included in a predetermined adjustment region. Accordingly, the conversion coefficient calculator 720 calculates a conversion coefficient of the current pixel in a relevant adjustment region using Equation 7 in accordance with the variable set of the at least one adjustment region provided by the adjustment region information storage unit 530.

The coordinate converter 730 receives the conversion coefficient of the current pixel in the relevant adjustment region calculated by the conversion coefficient calculator 720 and the variable set of the relevant adjustment region and adjusts a color of the current pixel by converting the color coordinate point P(x, y) of the current pixel into a color coordinate point P'(x', y') as shown in Equation 8.

The method and apparatus for adjusting a color of an image according to an embodiment of the present invention can be used by manufacturers of color image processing devices, such as digital color TVs and digital still cameras, to adjust basic color reproducing characteristics of manufactured products and by end-users to convert colors. Also, image editors can use the method and apparatus for adjusting a color of an image according to an embodiment of the present invention.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

As described above, according to embodiments of the present invention, the degrees of freedom in selecting a color region to be adjusted and an adjustment level are selected by setting an adjustment region on a color space to an ellipse which can most properly express a color range recognized as a single color by a person and performing color adjustment in a way of varying a centroid point of the ellipse, i.e., a reference color, and a target color into which the reference color has to be adjusted. Also, since discontinuity of a color space is not generated in an image for which color adjustment is performed, a converted image becomes natural.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of adjusting colors of an image, comprising:
   setting more than one adjustment regions shaped as an ellipse in a color space; and
   converting colors of pixels included in each adjustment region to other colors based on a variable set,
   wherein a coordinate point of a reference color is set to a centroid point of the ellipse, including a coordinate point of a target color into which the reference color has to be converted,
   wherein a color coordinate point of a current pixel is converted into an adjusted color coordinate point using a conversion coefficient determined based on the coordinate point of the target color, the centroid point of the ellipse and a boundary of the ellipse, and
   wherein the converting of the colors of the pixels included in each adjustment region comprises
      changing color coordinates of a current pixel for each adjustment region in pixel units:
      determining whether a color of each pixel is included in each adjustment region using the changed color coordinates of the current pixel;
      calculating the conversion coefficient of the current pixel with respect to each adjustment region including the current pixel; and
      converting the color coordinate point of the pixel using the conversion coefficient in each adjustment region including the current pixel.

2. The method of claim 1, wherein the setting of each adjustment region comprises:
   setting the coordinate point of the reference color, the coordinate point of the target color into which the reference color is converted, lengths of a long-axis and a short-axis of the ellipse, and a rotation angle of the ellipse; and setting the ellipse having the coordinate point of the reference color as a centroid and including the coordinate point of the target color, to each adjustment region, the ellipse being formed by the lengths of the long-axis and the short-axis and the rotation angle of the ellipse and including the coordinate point of the target color.

3. The method of claim 2, wherein the setting of each adjustment region further comprises:

determining first and second variables obtained from the rotation angle of the ellipse and third and fourth variables obtained from the lengths of the long-axis and the short-axis of the ellipse, the coordinate point of the reference color and the coordinate point of the target color as the variable set for each adjustment region.

4. The method of claim 3, wherein the first, second, third and fourth variables are calculated using the following equation:

$$m_1 = \cos(-\theta)$$

$$m_2 = \sin(-\theta)$$

$$f = \frac{1}{a^2}$$

$$g = \frac{1}{b^2}$$

wherein $m_1$ indicates the first variable, $m_2$ indicates the second variable, f indicates the third variable, g indicates the fourth variable, a indicates the length of the long-axis of the ellipse, b indicates the length of the short-axis of the ellipse, and $\theta$ indicates the rotation angle of the ellipse.

5. The method of claim 1, wherein the variable set is determined for each adjustment region and the variable sets are stored as a lookup table.

6. The method of claim 1, wherein the changing of color coordinates of the current pixel is performed using the following equation:

$$\begin{bmatrix} p1_x \\ p1_y \end{bmatrix} = \begin{pmatrix} m_1 & -m_2 \\ m_2 & m_1 \end{pmatrix} \begin{pmatrix} x - x_r \\ y - y_r \end{pmatrix} = \begin{pmatrix} m_1(x - x_r) - m_2(y - y_r) \\ m_2(x - x_r) + m_1(y - y_r) \end{pmatrix}$$

wherein $m_1 = \cos(-\theta)$, and $m_2 = \sin(-\theta)$ when a and b indicate lengths of a long-axis and a short-axis of an ellipse corresponding to a predetermined adjustment region, $\theta$ indicates a rotation angle of the ellipse, $(p1_x, p1_y)$ indicates a changed color coordinate point, (x, y) indicates a color coordinate point of an input pixel, and $(x_r, y_r)$ indicates a coordinate point of a reference color.

7. The method of claim 1, wherein the determining of whether the color of each pixel is included in each adjustment region is performed using the following equation:

$$f \times pl_x^2 + g \times pl_y^2 \leq 1$$

wherein $f = 1/a^2$, and $g = 1/b^2$ when a and b indicate lengths of a long-axis and a short-axis of an ellipse corresponding to a predetermined adjustment region, $\theta$ indicates a rotation angle of the ellipse, and $(pl_x, pl_y)$ indicates a changed color coordinate point.

8. The method of claim 1, wherein the calculating of the conversion coefficient is performed using the following equations:

$$B = \frac{p1_y}{p1_x}$$

$$r = \sqrt{x_c^2 + y_c^2} = \sqrt{\frac{1+B^2}{f+gB^2}}$$

$$\alpha = \frac{r - \|P - R\|}{r} = \frac{r - \sqrt{(x-x_r)^2 + (y-y_r)^2}}{r}$$

wherein B indicates a slope of a straight line y=Bx connecting a color coordinate point P(x, y) of the current pixel and the centroid point of an ellipse, r indicates a distance between coordinates $(x_r, y_r)$ of a reference color R and an outline boundary of an adjustment region on a line passing through the color coordinate point P(x, y) of an input pixel P, $(x_c, y_c)$ indicates a coordinate point of an intersection point between the straight line y=Bx and the outline boundary of the adjustment region, $\alpha$ indicates a conversion coefficient and $f=1/a^2$, and $g=1/b^2$ when a and b indicate lengths of a long-axis and a short-axis of the ellipse.

9. The method of claim 8, wherein the distance r is calculated as r=1/g when $pl_x^2=0$ and the distance r is calculated as r=1/f when $pl_y^2=0$.

10. The method of claim 1, wherein the converting of the color coordinate is performed using the following equation:

$$\begin{bmatrix} x' \\ y' \end{bmatrix} = \begin{bmatrix} x \\ y \end{bmatrix} + \alpha \begin{bmatrix} x_r' - x_r \\ y_r' - y_r \end{bmatrix}$$

wherein (x', y') indicates a color coordinate point obtained as a color adjustment result, (x, y) indicates a color coordinate point of the current pixel, $\alpha$ indicates a conversion coefficient, $(x_r, y_r)$ indicates reference color coordinates, and $(x_r', y_r')$ indicates target color coordinates.

11. The method of claim 10, wherein the adjusted color coordinates (x', y') is set to the target color coordinates $(x_r', y_r')$ when the color coordinate point P(x, y) of the current pixel matches the reference color coordinate point $R(x_r, y_r)$.

12. The method of claim 1, wherein priorities are allocated for each adjustment region.

13. The method of claim 12, wherein the converting of the colors of the pixels further comprises if the current pixel is included in more than one adjustment region, converting the color coordinate point of the current pixel by a conversion coefficient calculated for the current pixel in an adjustment region having a highest priority.

14. The method of claim 1, wherein weights are allocated for each adjustment region.

15. The method of claim 14, wherein the converting of the colors of the pixels further comprises if the current pixel is included in more than one adjustment region, the color coordinate point of the current pixel is converted for each adjustment region using a conversion coefficient calculated for the current pixel, the weights are multiplied by the converted color coordinate points, and a vector sum operation is performed.

16. A non-transitory computer readable medium having recorded thereon a computer readable program for performing a method of adjusting colors of an image, the method comprising:

setting more than one adjustment region shaped as an ellipse in a color space; and converting colors of pixels included in each adjustment region to other colors based on a variable set, wherein a coordinate point of a reference color is set to a centroid point of the ellipse, including a coordinate point of a target color into which the reference color has to be converted, wherein a color coordinate point of a current pixel is converted into an adjusted color coordinate point using a conversion coefficient determined based on the coordinate point of the target color, the centroid point of the ellipse and a boundary of the ellipse, and wherein the converting of the colors of the pixels included in each adjustment region comprises changing color coordinates of a current pixel for each adjustment region in pixel units;

determining whether a color of each pixel is included in each adjustment region using the changed color coordinates of the current pixel;

calculating the conversion coefficient of the current pixel with respect to each adjustment region including the current pixel; and converting the color coordinate point of the pixel using the conversion coefficient in each adjustment region including the current pixel.

17. An apparatus for adjusting colors of an image, comprising:

an adjustment unit setting more than one adjustment region shaped as an ellipse in a color space; and a color converter unit converting colors of pixels included in each adjustment region to other colors based on a variable set, wherein a coordinate point of a reference color is set to a centroid point of the ellipse, including a coordinate point of a target color into which the reference color has to be converted, wherein a color coordinate point of a current pixel is converted into an adjusted color coordinate point using a conversion coefficient determined based on the coordinate point of the target color, the centroid point of the ellipse and a boundary of the ellipse, and wherein the color converter unit comprises an adjustment region information storage unit storing a variable set including a plurality of variables obtained from the lengths of the long-axis and the short-axis of the ellipse, and the rotation angle of the ellipse, the reference color coordinate point, and the target color coordinate point, for each of the adjustment regions;

an adjustment object determinator determining whether a current pixel is a pixel to be adjusted by judging whether the current pixel is included in each adjustment region; and a color adjustment unit performing the color adjustment based on a color coordinate point of the current pixel and the variable set of the corresponding adjustment region if determined that the current pixel is included in each adjustment region.

18. The apparatus of claim 17, wherein in the adjustment unit, each adjustment region is set further using lengths of a long-axis and a short-axis of the ellipse, and a rotation angle of the ellipse.

19. The apparatus of claim 17, wherein the color converter unit calculates the conversion coefficient of the current pixel with respect to an adjustment region including the current pixel and converts the color coordinate point of the current pixel into the adjusted color coordinate point using the calculated conversion coefficient.

20. The apparatus of claim 17, wherein in the adjustment unit, priorities are allocated for each of the adjustment regions.

21. The apparatus of claim 20, wherein the color converter unit converts the color coordinate point of a current pixel by the conversion coefficient calculated for the current pixel in an adjustment region having a highest priority, if the current pixel is included in more than one adjustment region.

22. The apparatus of claim 17, wherein weights are allocated for each adjustment region.

23. The apparatus of claim 22, wherein the color coordinate point of a current pixel is converted for each adjustment region using the conversion coefficient calculated for the current pixel obtaining converted color coordinate points, the weights are multiplied by the converted color coordinate points, and a vector sum operation is performed, if the current pixel is included in more than one adjustment region.

24. The apparatus of claim 17, wherein the adjustment unit sets an adjustment region based on information input by a user through a user interface.

25. The apparatus of claim 17, wherein the color adjustment unit includes a switching unit, a conversion coefficient calculator and a coordinate converter.

26. The apparatus of claim 25, wherein the switching unit receives an adjustment object determination result from the adjustment object determinator and provides the current pixel to the conversion coefficient calculator.

27. The apparatus of claim 26, wherein the switching unit allows the current pixel to be color-adjusted if determined that the current pixel is a pixel to be adjusted.

28. The apparatus of claim 26, wherein the switching unit prevents the current pixel from being color-adjusted if determined that the current pixel is not a pixel to be adjusted.

29. The apparatus of claim 25, wherein the conversion coefficient calculator calculates the conversion coefficient of the current pixel in a relevant adjustment region in accordance with the variable set of each adjustment region provided by the adjustment region information storage unit.

30. The apparatus of claim 29, wherein the coordinate converter receives the conversion coefficient of the current pixel in the relevant adjustment region calculated by the conversion coefficient calculator and the variable set of the relevant adjustment region and adjusts a color of the current pixel by converting a first color coordinate point of the current pixel into a second color coordinate point.

* * * * *

UNITED STATES PATENT AND TRADEMARK OFFICE
CERTIFICATE OF CORRECTION

| | |
|---|---|
| PATENT NO. | : 7,852,533 B2 |
| APPLICATION NO. | : 10/931255 |
| DATED | : December 14, 2010 |
| INVENTOR(S) | : Dusik Park et al. |

It is certified that error appears in the above-identified patent and that said Letters Patent is hereby corrected as shown below:

Column 8, Line 54, in claim 1, delete "units:" and insert --units;--, therefor.

Signed and Sealed this
Fifteenth Day of March, 2011

David J. Kappos
*Director of the United States Patent and Trademark Office*